C. S. PARCELLS.
HEADLIGHT MECHANISM.
APPLICATION FILED APR. 17, 1913.

1,091,532.

Patented Mar. 31, 1914.
2 SHEETS—SHEET 1.

Witnesses
Frances Jacobowitz
Ada M. Whitmore

Inventor
Charles S. Parcells
By H. H. Simms
his Attorney

C. S. PARCELLS.
HEADLIGHT MECHANISM.
APPLICATION FILED APR. 17, 1913.
1,091,532.
Patented Mar. 31, 1914.
2 SHEETS—SHEET 2.
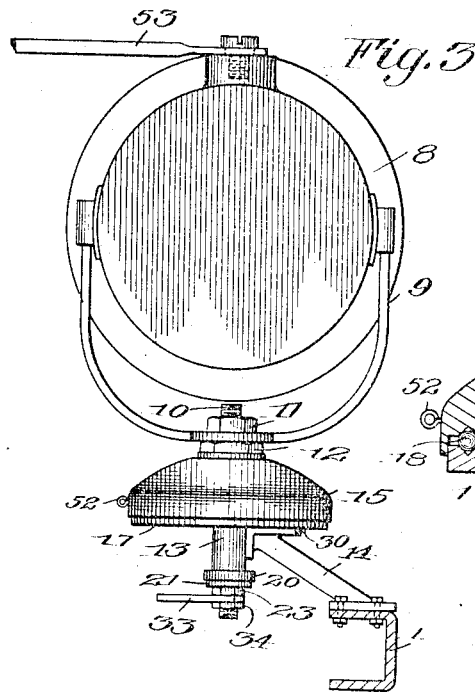
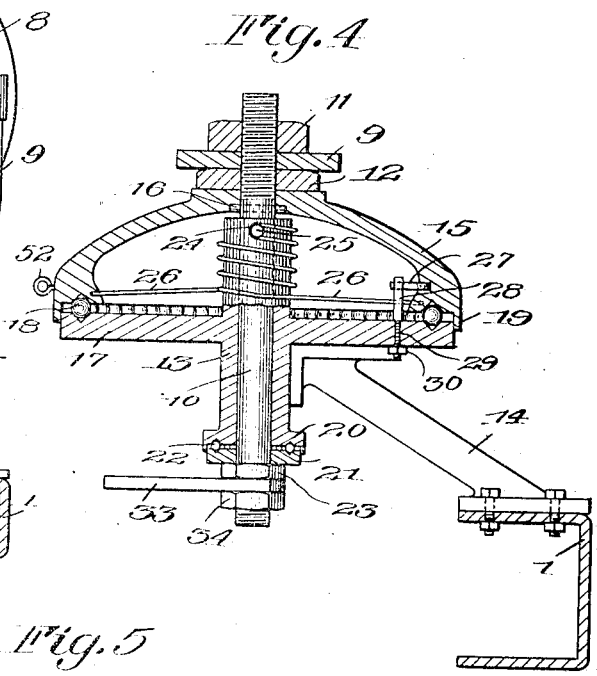
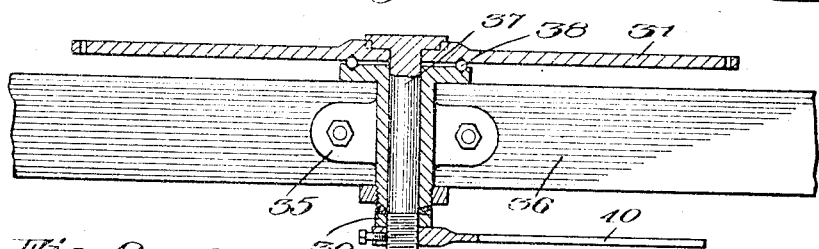
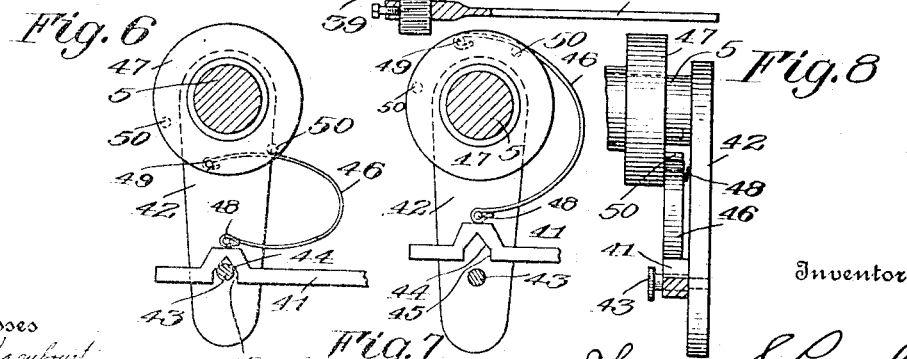
Witnesses
Inventor
Charles S. Parcells
By
his Attorney

UNITED STATES PATENT OFFICE.

CHARLES S. PARCELLS, OF OVID, NEW YORK.

HEADLIGHT MECHANISM.

1,091,532.  Specification of Letters Patent.  Patented Mar. 31, 1914.

Application filed April 17, 1913. Serial No. 761,664.

*To all whom it may concern:*

Be it known that I, CHARLES S. PARCELLS, of Ovid, in the county of Seneca and State of New York, have invented a new and useful Improvement in Headlight Mechanisms, which improvement is fully set forth in the following specification and shown in the accompanying drawings.

The present invention relates to headlight mechanisms for vehicles, such as automobiles, motor boats, trolley cars, and locomotives, and an object of the same is to provide a construction in which there are employed two lamps, one of which maintains a position to direct its rays in line with the body of the vehicle while the other is shifted to direct its rays in the direction of the turning of the vehicle, the movable lamp being located on the side of the vehicle opposite that to which the vehicle is to be turned so that the axis of the beam of the lamp will cross the axis of the beam of the other lamp and, in this way, any projecting portions on the vehicle in proximity to the lamp, such, for instance, as the wheel and fender of an automobile will not interfere with the beam of ray and also the rays will extend from that portion of the vehicle which projects the farthest forward during the turning.

Another object of the invention is to provide a simple mechanism for controlling headlight lamps in such a manner that one may turn independently of the other.

Still another object of the invention is to provide a strong and durable support for headlight lamps permitting the latter to turn easily and at the same time preventing its getting out of order from the vibrations or shocks to which the vehicle is subjected.

To these and other ends the invention consists of certain parts and combinations of parts, all of which will be hereinafter described and more particularly pointed out in the appended claims.

Figure 1:
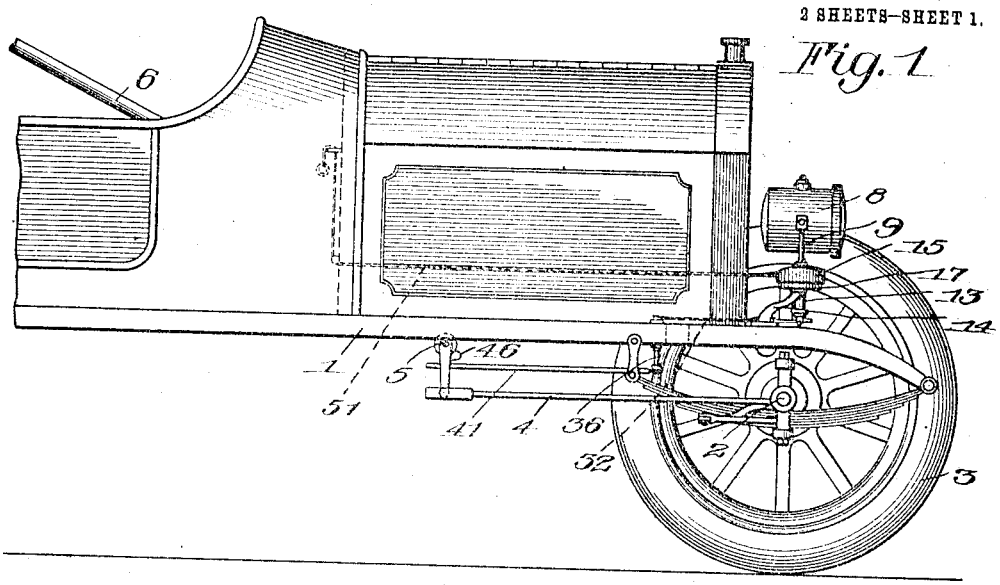
Figure 2:
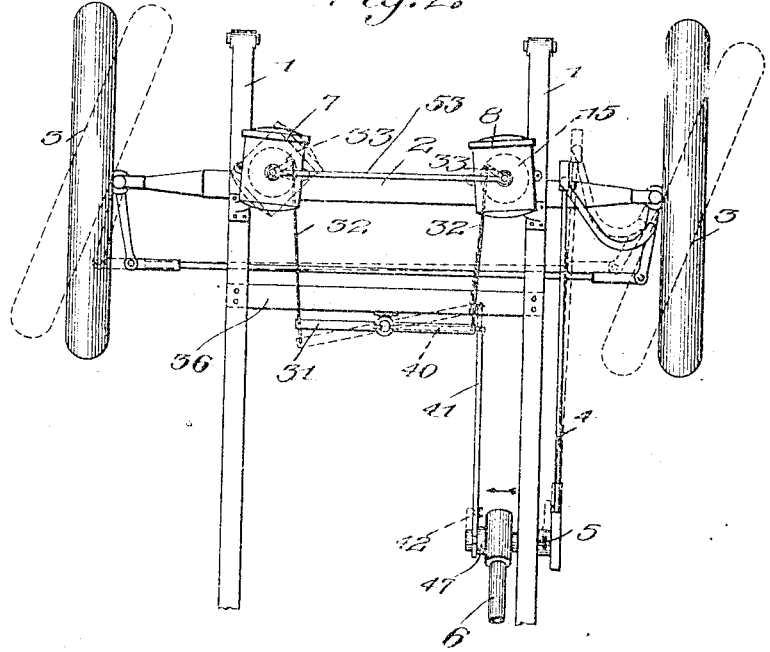

In the drawings: Figure 1 is a side view of a portion of a motor vehicle to which this invention is shown applied; Fig. 2 is a plan view of one of the lamps and its supporting means; Fig. 3 is a rear view of one of the lamps and its supporting means; Fig. 4 is a vertical section through the supporting means; Fig. 5 is a detail sectional view showing the manner of supporting the equalizing member; and Figs. 6, 7 and 8 are detail views of the combined shock absorber and throw out interposed between the lamp operating mechanism and the steering mechanism of the vehicle.

According to the prevent invention, a structure is provided in which two lamps are arranged, side by side, and are connected to the vehicle in such a manner that when the vehicle is turning a corner, the lamp on that side opposite the direction in which the vehicle is about to turn, projects the axis of its beam of rays across the axis of the beam of rays of the other lamp and in the direction in which the vehicle is about to turn, the other lamp remaining stationary with relation to the vehicle so that it projects its rays in the direction of the length of the vehicle or, in other words, substantially in the direction in which the vehicle has previously traveled. In this way, the person in control of the vehicle is able to maintain his bearings because he has before him views of both directions. When a vehicle is traveling straight ahead, both rays preferably focus at a point some distance ahead of the vehicle and, in this way, an intense field of light is provided during the ordinary travel or movement of the vehicle. Provision is also made for operating the lamps independently of the steering mechanism so that the person in control of the vehicle may control the shifting of the lamps for the purpose of viewing the objects on the sides of the road.

In the illustrated embodiment of the invention, wherein the same is shown as applied to a motor vehicle, 1 indicates the longitudinal frame members of the motor vehicle which may be, as usual, connected near their forward ends by the axle 2 to which the spindles of the wheels 3 are pivotally secured, said wheels being controlled by a suitable steering mechanism 4 which, in this instance, employs a rock shaft 5 mounted on the frame of the vehicle and controlled by the steering shaft 6 leading to the usual hand wheel (not shown).

The head-light mechanism embodies the two lamps 7 and 8 which are preferably supported in a manner to be described so that the axes of their beams focus at a point some distance ahead of the vehicle say, for instance, three hundred feet, or any other distance depending on the desire of the one in control of the vehicle. Each of these lamps is supported upon a bracket 9 of suitable construction secured to a rock shaft 10 between the two nuts 11 and 12. The shaft turns loosely in a sleeve 13 which may be rigidly secured to a bracket arm 14 of suitable shape preferably bolted or otherwise attached to the vehicle as, for instance, to one of the frame pieces 1.

In order to provide an extended or wide bearing for each lamp so that vibrations or shocks will not affect the same, a member 15 preferably of inverted cup-shape is rigidly secured, as by a pin 16, to the rock shaft 10 and is disposed over a disk-shaped flange 17 surrounding the sleeve 13 at a point between the ends of the latter, said sleeve projecting from opposite sides of the disk or flange. The periphery of the cup-shaped member 15 is provided with an annular groove of V-shape in cross section and the upper face of the flange 17 is provided with a V-shaped groove to register with the groove in the cup-shaped member to form a race way for the balls 18. This race way may be protected against dust by a flange 19 which depends from the cup-shaped member 15 about the periphery of the flange 17. The nuts 11 and 12 together with the lamp bracket lie above this cup-shaped member 15.

The lower end of the bearing sleeve 13 is enlarged and is provided with an annular groove of V-shape in cross section and also with a depending flange 20 which surrounds a disk 21 on the rock shaft 10, said disk also being provided with an annular groove of V-shape in cross section forming with the groove at the end of the sleeve 10, a race way for the balls 22, the projection 20 serving to protect such race-way against the entrance of dust. This disk 21 is held to the end of the sleeve 13 by a lock nut 23. It will be noted that by adjusting the lock nut 23, the desired pressure on the balls 18 and 21 may be obtained and in this way all looseness of parts with the consequent vibration is prevented. The cup-shaped member and the flange or disk 17 may be made of a width to correspond with the weight of a lamp so that the lamp may be provided with a base corresponding to such weight and, in this way, movement of the lamp laterally of its bearings is prevented.

Under normal conditions, each lamp lies in such a position that it directs its rays at a slight angle to the direction of the travel of the vehicle, and this position may be maintained in any suitable manner, but it is preferably accomplished through the medium of a spring. In this instance, this spring is housed between the cup-shaped member 15 and the flange 19 on the sleeve so that said spring is protected against dirt and malicious manipulation. This spring may be made from a single piece of wire which is first bent about midway between its ends and then coiled from the bent portion. This bent portion which is indicated at 24, serves as an effective means for anchoring one end of the spring as it surrounds a projection or screw 25 as shown in Fig. 4 when the spring is placed about the upper end of the sleeve 13. The two ends of the wire provide two spring arms 26 which are anchored to the cup-shaped member substantially at diametrically opposite points in order that the strain on the bearings will be equally distributed.

To limit the action of the cup-shaped member, and consequently the lamp, due to the spring, suitable stops are provided, preferably, one on the cup-shaped member and the other on the disk 17. These stops may be in the form of two pins 27 and 28. One of these pins may be rigid with the cup-shaped member and extend inwardly therefrom while the other may be adjustably mounted on the disk 17. This adjustment may be effected in any suitable manner but, in the present instance, the disk is provided with a slot 29 in which the pin 28 operates in order to be shifted to different position and is held in the adjusted position by a clamp nut 30. This adjustment is provided in order that the normal axis of the beam or rays may be shifted so that the two lights may be made to focus at any point ahead of the vehicle.

The mechanism which shifts one lamp independently of the other, preferably, embodies an equalizing member or bar 31 pivoted, preferably between its ends in a manner to be described and having flexible connection with both lamps. In this instance, a cable, chain, cord or other flexible element 32 is secured at one end to one end of the pivoted equalizing member 31 and at the other end is connected with the lamp, and, for this purpose, the rock shaft 10 has an arm 33 clamped on is lower end by a nut 34, said arm extending forwardly and inwardly so that a rearward pull thereon swings the lamp inwardly. This arm may be set at any desired angle either permanently or adjustably. As this arm extends forwardly, it tends, when a pull is exerted thereon, to move quicker at the start than at the end of its movement. This is particularly desirable in a mechanism of this kind as the light shifts quicker or travels farther during the first part of the turning movement of the vehicle than during the latter part of the movement.

For pivoting the equalizing lever, a bracket 35 may be bolted or otherwise secured to the cross piece 36ᵃ at the forward end of the machine. This bracket serves as a bearing for a pivot bolt 36, the head of which is interlocked with the equalizer bar 31 in such a manner that it turns with the bar. The under surface of the equalizer bar 31 is provided with an annular groove of V-shape in cross section which registers with a like groove on the upper part of the bracket bearing 36 to form a race way for the balls 38 to reduce the friction between the equalizer bar and its bearing. The lower end of the bearing 35 is also formed with an annular groove of V-shape in cross section and with this groove registers a like groove on an adjusting nut 39 arranged on the lower end of the pivot belt 37. The equalizer bar or member is connected with the steering mechanism of the vehicle and to this end the pivot bolt 37 carries at its lower end an arm 40 to which is connected the pull rod 41 which is in turn connected to the shaft 5 of the steering mechanism before mentioned.

Another important feature in this invention is the combined shock absorber and throw out which is interposed between the steering mechanism and the lamp operating mechanism. This comprises a crank arm 42 rigidly secured, preferably, to the stub shaft 5 of the steering mechanism and having a headed crank pin 43 eccentrically arranged thereon. For coöperation with this crank pin 43, the pull bar 41 is formed with a recess or notch which receives said pin 43. This notch is of peculiar formation, having its inner end formed with two converging walls 44 which simultaneously coöperates with the crank pin 43 while the parts are not working. However, upon the operation of the steering mechanism, this crank pin bears firmly against one or the other of said walls and rides along the same until it coöperates with one of the walls 45 which stops the movement of the pin relatively to the push rod to transmit such motion to said push rod.

In order that the pin will normally lie in the shaped crotch formed by the walls 44, a resilient device bears against the pull bar. This resilient device may be of any suitable construction but preferably it is in the form of a bowed spring 46 of flat stock, one end of said spring being directly connected to the pull bar and the other end being adjustably supported. In this instance, this adjustment comprises a disk 47 rotatably mounted upon the stub shaft 5 and having one end 48 connected to the pull bar 41 while the other end 49, of the spring 46 is eccentrically connected thereto so that, upon the rotation of the disk, the spring will be raised and lowered thus carrying or elevating the pull bar 41 out of connection with the crank pin 43 on the crank shaft 42. The rotation of the disk 47 is limited by pins 50 one on each side of the connection 49 to coöperate with the bowed spring after the end 48 of the latter has been carried past the dead center, at both ends of its movement. This combined shock absorber and throwout removes all strain from the lamp operating mechanism due to the sudden operation of the steering mechanism and it further provides a conneciton by which the lamp mechanism may be disconnected from the steering mechanism when the lamps are not being used.

The flexible connections between the lamps and the equalizing bar permit such lamps to be turned independently of the operating mechanism and I am therefore enabled to use these lamps for viewing objects along the sides of the road, as for instance, as sign boards and numbers on houses and also for lighting the road in rear of the vehicle for backing. With this purpose in view, a flexible connector leads from each of the lamps to a point where it may be readily reached from the seat of the vehicle. This connection is indicated at 51 and it attaches to an eye or other device 52 on the inverted cup member 15.

With the object in view of further supporting the lamps against vibration, there may be provided a connecting bar 53 between the tops of the lamps, said bar being connected to the lamps at their centers of rotation and serving to steady the same.

In the operation of the invention, the lamp operating mechanism is connected to the steering mechanism through the means of the combined shock absorber and throwout. When the steering mechanism is operated to turn the vehicle to the right, the lamp on the left hand side of the machine turns in the direction of the turning of the vehicle while the lamp on the right hand side of the machine does not move, and vice versa. With this arrangement, the beam of rays projects from that portion of the vehicle which extends farthest forward during the turning, and the wheel and the mud guard do not interfere with the beam of light, as it would if the lamp on the other side were turned outwardly. The lamps are supported on a wide base and turn on ball bearings which give them ease of action and prevent vibration. The operating mechanism for the lamps is of a very simple construction and not liable to get out of order. The cost of installing the same is small and the parts are so formed that they may be mounted in out-of-the-way places so that the mechanism is inconspicuous. The equalizing bar may be mounted back of the heater, under the fan and ahead of the engine, and may be inclosed by the mud pan.

It is apparent that some of the features of construction are also capable of use in connection with headlight mechanisms operating on principles different from that herein shown.

What I claim as my invention and desire to secure by Letters Patent is:

1. In a headlight mechanism, the combination with a pair of lamps, of operating mechanism for the lamps embodying a pivoted member mounted to turn about an upright axis in rear of the lamps, said axis being arranged substantially an equal distance from both lamps, and flexible connections between the lamps and the pivoted member on opposite sides of the pivot of the latter whereby when said member is moved in one direction it moves one lamp without affecting the other, and vice versa.

2. In a headlight mechanism, the combination with a pair of lamps having arms connected thereto and extending forwardly and inwardly therefrom, of operating mechanism for the lamps embodying a pivoted member, and flexible connections between the forward and inwardly-extending arms and the pivoted member on opposite sides of the pivot of the latter, whereby each lamp can turn independently of the other to project its beam across the beam of the other lamp in front of the latter and each lamp, on turning, moves at a greater speed during the first part of its movement than during the latter part.

3. In a headlight mechanism, the combination with a pair of lamps, of operating mechanism for the lamps embodying a pivoted member, flexible connection between the lamps and the pivoted member on opposite sides of the pivot of the latter, and means for shifting either of the lamps independently of the other without shifting the pivoted member.

4. In a headlight mechanism, the combination with a pair of pivotally mounted lamps, of operating mechanism for the lamps having connection with the latter permitting the lamps to be moved independently of the operating mechanism, and means for moving the lamps independently of each other and independently of the operating mechanism so that the lamps may be swung to illuminate objects on either side of the roadway or be turned to illuminate objects in the rear of the vehicle.

5. In a headlight mechanism, a lamp having a pivotal support comprising a sleeve formed with a surrounding flange, a rock shaft turning in said sleeve and having a portion carried thereby for bearing against the flange and also a portion at its lower end bearing against the lower end of the sleeve, and a spring housed between the flange and the portion on the rock shaft which coöperates with said flange.

6. In a headlight mechanism, a lamp having a pivoted support comprising a sleeve formed with a surrounding flange, a rock shaft turning in said sleeve, carrying a member for coöperating with the flange and having a screw threaded portion projecting above said member, a U-shaped bracket for the lamp fitted on the screw threaded portion, and a nut for holding said bracket to said screw threaded portion.

7. In a headlight mechanism, the combination with a pair of lamps mounted to turn about vertical axes, of a connecting bar between the lamps, said bar being connected to the latter at their centers of rotation and serving to steady the lamps.

8. In a headlight mechanism, a lamp having a pivotal support comprising a bearing member, a rock shaft turning in said member, an inverted cup-shaped member on the shaft coöperating with the bearing member, and a spring mounted in the cup-shaped member for connecting the latter with the bearing member.

9. In a headlight mechanism, a lamp having a support comprising a sleeve, a flange projecting from the sleeve between the ends thereof, a rock shaft turning in the sleeve, a cup-shaped member secured to the rock shaft, balls interposed between the cup-shaped member and the flange, a collar surrounding the shaft below the sleeve, balls interposed between said collar and the sleeve, and a nut operating on the shaft against the collar for taking up play between the cup-shaped member and the flange.

10. In a headlight mechanism, a lamp having a support comprising a bearing member, a rock shaft turning in said bearing member, a cup-shaped member secured thereto and coöperating with said bearing member, and a spring interposed between said cup-shaped member and the bearing member.

11. In a headlight mechanism, a lamp having a support comprising a bearing member, a rock shaft turning therein, a cup-shaped member coöperating with the bearing member and carried by the rock shaft, and a spring formed from a single piece of wire bent between its ends and coiled, the coil surrounding the rock-shaft, the intermediate bend being secured to the bearing member and the two arms being secured to the cup-shaped member substantially at diametrically opposite points.

12. The combination with a vehicle and a steering mechanism therefor, of a headlight mechanism having connection with the steering mechanism to be shifted by the latter, said connection having a shock absorber adjustable to disconnect the headlight mechanism from the steering mechanism.

13. The combination with a vehicle having a steering mechanism, of a headlight mechanism, a pull bar connected to said headlight mechanism having a recess, a crank shaft connected to the steering mechanism and having a crank pin fitted in said recess, and means for shifting said pull rod to cause it to disengage with the crank pin.

14. The combination with a vehicle having a steering mechanism embodying a rock shaft, of a headlight mechanism, a pull bar connected to the headlight mechanism and provided with a recess, a crank arm connected to the rock shaft and having a crank pin operating in the recess of the pull bar, and a member rotatably mounted on the rock shaft and connected to the pull bar to disconnect the latter from the crank pin.

15. The combination with a vehicle having a steering mechanism embodying a rock shaft, of a headlight mechanism, a pull bar connected to the headlight mechanism and provided with a recess having converging walls, a crank arm connected to the rock shaft and having a crank pin operating in the recess, and resilient means acting on the pull bar to cause the converging walls of the recess to coöperate with crank pin under normal conditions but to permit the crank pin to shift in the recess when the steering mechanism is operated.

16. The combination with a vehicle having a steering mechanism embodying a rock shaft, of a headlight mechanism, a pull bar connected to the headlight mechanism and provided with a recess having converging walls, a crank arm connected to the rock shaft and having a crank pin operating in the recess, a member rotatably mounted on the rock shaft, and a spring connecting said member and the pull bar to lift the latter out of connection with the crank pin and to provide a resilient means permitting the crank pin to move in the recess of the pull bar.

17. The combination with a vehicle having a steering mechanism embodying a rock shaft, of a headlight mechanism, a pull bar connected to the headlight mechanism and provided with a recess having converging walls, a crank arm connected to the rock shaft and having a crank pin operating in the recess, a member rotatably mounted on the rock shaft, a bowed spring connecting said member and the pull bar to lift the latter out of connection with the crank pin and to provide a resilient means permitting the crank pin to move in the recess of the pull bar, and stops arranged to coöperate with the spring to limit the rotation of the rotary member.

CHARLES S. PARCELLS.

Witnesses:
JOHN M. SUTTON,
PATRICK SAVAGE.